(No Model.)
R. A. CHESEBROUGH.
EXTRACTING PERFUMES.
No. 475,437. Patented May 24, 1892.
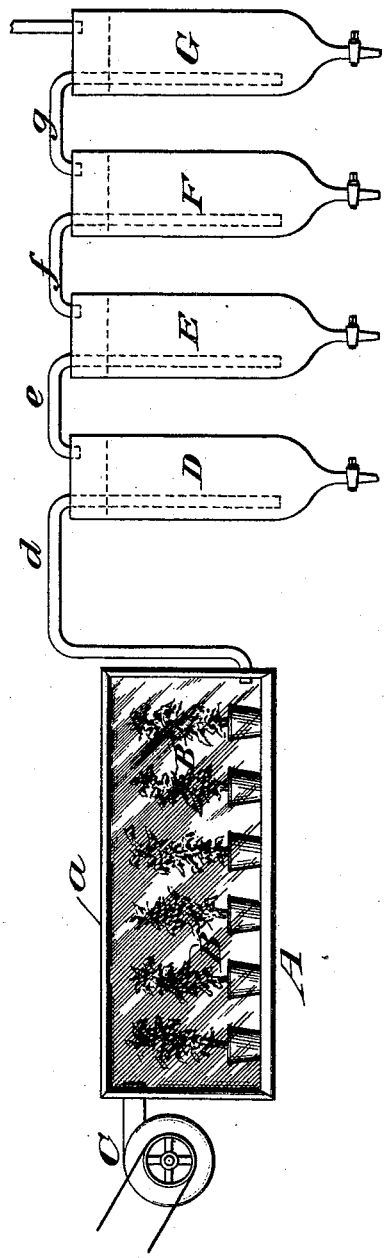
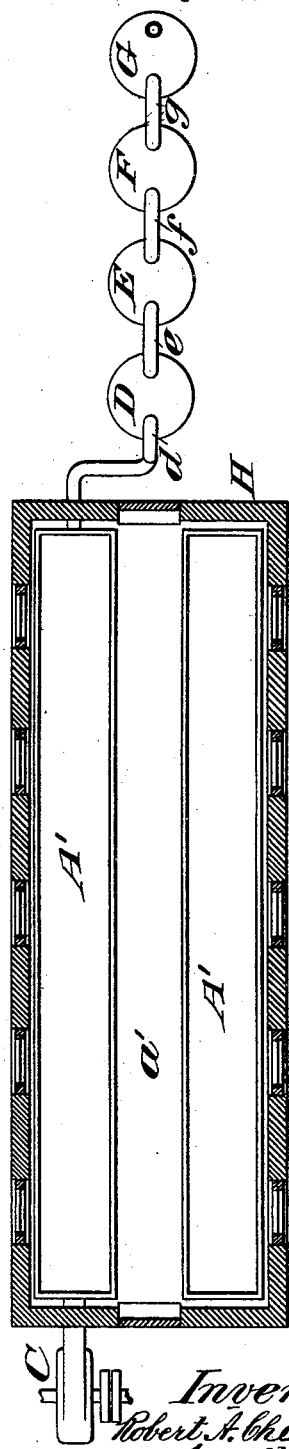
Witnesses:
D. H. Hayward
C. E. Sundgren
Inventor:
Robert A. Chesebrough
by attorneys
Brown & Seward

UNITED STATES PATENT OFFICE.

ROBERT A. CHESEBROUGH, OF NEW YORK, N. Y.

EXTRACTING PERFUMES.

SPECIFICATION forming part of Letters Patent No. 475,437, dated May 24, 1892.

Application filed October 17, 1891. Serial No. 409,032. (No model.)

*To all whom it may concern:*

Be it known that I, ROBERT A. CHESEBROUGH, of New York, in the county and State of New York, have invented a new and useful Improvement in the Method of Extracting Perfumes, of which the following is a specification.

My invention relates to an improvement in the method of extracting perfumes, with the object in view of securing an extract of a delicate nature and free from undesirable properties commonly possessed in an extract where grease is employed as a vehicle.

My invention consists in forcing the perfume-laden air surrounding the flowers or other odoriferous substances directly into an absorbent—such, for example, as the alcohol commonly prepared for such purposes and known as "cologne spirits."

My invention further consists in forcing the perfume-laden air surrounding live growing plants into an absorbent, and thereby securing a perfume free from the contaminating effect of the scent of any juices or decay attendant upon dead crushed flowers.

In the accompanying drawings, Figure 1 represents an inclosure in which the odor-producing material is located, an air-blower for inducing a draft, and a series of vessels through which the perfume-laden air is caused to successively pass, the whole being shown in side elevation. Fig. 2 represents a top plan view of the interior of an inclosure in which there is a center passage-way and arrangements for flower-beds on each side, the air-blower being shown in connection with the inclosure.

For purposes of illustration I have shown the odor-producing material as consisting of live growing plants or flowers.

The inclosure in Fig. 1 is represented by A and has a glass top and front $a$. The plants are represented by B, the blower by C, and the receiving-vessels by D, E, F, and G. The height of the liquid in the vessels is represented by a dotted line, the air being discharged from pipes $d$, $e$, $f$, and $g$ at points below the surface, preferably near the bottom, and conducted away from points above the surface of the liquid.

In Fig. 2 the conservatory is represented by H, the inclosures of the flower-beds by A', the passage-way by $a'$, and the blower and the receiving-vessels by the same letters as in Fig. 1.

In operation, the odor-producing material having been inclosed and the proper connections having been made with the blower and the receiving vessel or vessels, the blower is set in operation and a draft of air thereby set in motion through the inclosure and the receiving vessel or vessels. The air, heavily laden with the perfume from the inclosed odor-producing material, is first caused to pass through the liquid in the receiver D, which absorbs the whole or part of the perfume. If a portion of the perfume remains unabsorbed, it passes into the next receiver and is there further acted upon by the absorbent in that receiver. The number of receivers might be increased at pleasure to complete the absorption of the perfume. The last receiver D is filled with water (distilled water is used) for the purpose of absorbing any alcohol and perfume which may be evaporated from the preceding vessels and be carried over with the air and will produce a perfumed water. When growing plants are employed, the fresh air supplied to the plants and the sunlight through the glass portion of the inclosure will keep the plants thrifty, the necessary moisture being supplied from below, so that the process may be continued throughout the natural life of the plant and the perfume will be of the most delicate nature.

It is obvious that other means—such, for example, as a common air-pump—might be employed to induce a draft, and that inclosures of various forms might be provided to confine the perfumes of the plants.

As distinguished from the method heretofore employed in enfleurage, where grease was used as a vehicle and the perfume subsequently digested out of the grease, my present method contemplates the direct absorption of the perfume from the perfume-laden air, and thereby enables me to provide an extract uncontaminated by the constituent odors of grease.

What I claim is—

1. The method of extracting perfume from flowers or other odoriferous substances, consisting in forcing the perfume-laden air surrounding the flowers or other odoriferous substance directly into cologne spirits or similar absorbent, substantially as set forth.

2. The method of extracting perfume from flowers, consisting of inclosing growing plants and subsequently forcing the perfume-laden air surrounding said growing plants into an absorbent, substantially as set forth.

ROBERT A. CHESEBROUGH.

Witnesses:
 FREDK. HAYNES,
 C. E. LUNDGREN.